US012006900B1

(12) United States Patent
Ward et al.

(10) Patent No.: US 12,006,900 B1
(45) Date of Patent: Jun. 11, 2024

(54) SYSTEM AND METHOD FOR MEASURING FLUID DELIVERY FROM A MULTI-FLUID INJECTOR

(71) Applicant: Caterpillar Inc., Peoria, IL (US)

(72) Inventors: Scot D Ward, Pontiac, IL (US); Eric L Schroeder, Germantown Hills, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/361,117

(22) Filed: Jul. 28, 2023

(51) Int. Cl.

| | |
|---|---|
| ***F02M 43/04*** | (2006.01) |
| ***F02D 19/06*** | (2006.01) |
| ***F02D 19/08*** | (2006.01) |
| ***F02M 37/00*** | (2006.01) |

(52) U.S. Cl.
CPC ......... *F02M 43/04* (2013.01); *F02D 19/0628* (2013.01); *F02D 19/0642* (2013.01); *F02D 19/0665* (2013.01); *F02D 19/0694* (2013.01); *F02D 19/08* (2013.01); *F02M 37/0064* (2013.01); *F02M 37/0076* (2013.01); *F02D 2200/06* (2013.01)

(58) Field of Classification Search
CPC ............... F02M 43/04; F02M 37/0064; F02M 37/0076; F02D 19/0628; F02D 19/0642; F02D 19/0665; F02D 19/0694; F02D 19/08; F02D 2200/06
See application file for complete search history.

(56) References Cited

U.S. PATENT DOCUMENTS

| | | | |
|---|---|---|---|
| 4,461,169 | A | 7/1984 | Augustin |
| 5,801,308 | A | 9/1998 | Hara |
| 6,817,233 | B2 | 11/2004 | Toiyama et al. |
| 7,778,764 | B2 | 8/2010 | Ito et al. |
| 7,891,337 | B2 | 2/2011 | Takeuchi et al. |

FOREIGN PATENT DOCUMENTS

| | | | | | |
|---|---|---|---|---|---|
| CN | 103883445 | A | * | 6/2014 | ........... F02D 19/026 |
| CN | 111058985 | A | * | 4/2020 | ............. F02M 43/04 |
| DE | 4130394 | A1 | | 3/1992 | |
| GB | 1433875 | A | | 4/1976 | |
| WO | WO-8204097 | A1 | * | 11/1982 | |

* cited by examiner

*Primary Examiner* — Hung Q Nguyen
(74) *Attorney, Agent, or Firm* — Bookoff McAndrews, PLLC

(57) ABSTRACT

A system for measuring fuel delivery from a multi-fuel injector of a device includes a fuel injector for injecting a first fuel and a second fuel, a first fuel pump for supplying the first fuel to the fuel injector, a first sensor including a first measurement reservoir for measuring a volume of flow of the first fuel to the injector, the first measurement reservoir having a supply chamber that that decreases in volume upon actuation of the fuel injector, a second fuel pump for supplying the second fuel to the fuel injector, and a second sensor for measuring a volume of flow of the second fuel to the fuel injector.

20 Claims, 2 Drawing Sheets

SYSTEM AND METHOD FOR MEASURING FLUID DELIVERY FROM A MULTI-FLUID INJECTOR

TECHNICAL FIELD

The present disclosure relates generally to methods and systems for injectors, and, more particularly, to a system for measuring fuel delivery from a multi-fluid injector configured to inject two different fluids, such as fuels.

BACKGROUND

Use of alternative fuels, such as methanol and ethanol, in internal combustion engines can provide various benefits, such the ability to be generated with renewable sources of energy. However, complete combustion of an alternative fuel, such as methanol, can be more challenging in comparison to conventional fuels. For example, methanol may have reduced energy density, slower vaporization time, lower cetane number, and/or other attributes detrimental to combustion. To address these drawbacks, some internal combustion engines are designed to receive two different fuels, including a pilot fuel that generates a pilot flame which combusts an alternative fuel in a more complete and predictable manner.

Such multi-fuel capable internal combustion engines may utilize a multi-fuel injector to deliver both the pilot fuel and alternative fuel in a single injection event. Multi-fuel injectors should inject the pilot fuel and alternative fuel in correct proportions in order to achieve complete and efficient combustion. To test and/or calibrate a multi-fuel injector, it is beneficial to measure the delivered volume of each of the pilot fuel and alternative fuel individually, which can present challenges. Conventional devices, such as flow meters, cannot reliably measure the low-volume, pulsed flow generated by fuel injectors. As an alternative to a conventional flow meter, it may be possible to measure a total volume of the fuel (including both the pilot fuel and the alternative fuel) injected from the fluid injector, and subsequently separating the fuels using various means to measure their respective individual volumes. However, such methods are labor intensive and may involve complex chemical processes to separate the pilot and alternative fuels post-injection. Similar problems exist for multi-fluid injectors that are used with fluids other than fuel.

DE 4130394C2 ("the '394 patent") describes an injection quantity measurement arrangement having a closed pressure container of defined volume for storage of a fluid injected by a pump. A pressure measurement device detects fluid pressure changes inside the container subsequent to the injection, and determines the quantity of fluid injected on the basis of the pressure change. However, there is no provision in the '394 patent for independently measuring the volume of multiple fluids injected during the same injection event.

The systems and methods of the present disclosure may solve one or more of the problems set forth above and/or other problems in the art. The scope of the current disclosure, however, is defined by the attached claims, and not by the ability to solve any specific problem.

SUMMARY

According to one aspect of the present disclosure, a system for measuring fuel delivery from a multi-fuel injector of a device includes a fuel injector for injecting a first fuel and a second fuel, a first fuel pump for supplying the first fuel to the fuel injector, a first sensor including a first measurement reservoir for measuring a volume of flow of the first fuel to the injector, the first measurement reservoir having a supply chamber that that decreases in volume upon actuation of the fuel injector, a second fuel pump for supplying the second fuel to the fuel injector, and a second sensor for measuring a volume of flow of the second fuel to the fuel injector.

In another aspect, a method for measuring fuel delivery from a multi-fluid fuel injector includes supplying a first fuel from a first fuel circuit to the fuel injector, supplying a second fuel from a second fuel circuit to the fuel injector, actuating the fuel injector to deliver a volume of the first fuel and a volume of the second fuel from an outlet port of the fuel injector, determining the volume of the first fuel delivered from the fuel injector by measuring fluid displacement from a first measurement reservoir in fluid communication with the fuel injector, and determining the volume of the second fuel delivered from the fuel injector.

In yet another aspect, a system for measuring fluid delivery from a multi-fluid injector includes a fluid injector for injecting a first fluid and a second fluid, a first fluid pump for supplying the first fluid to the fluid injector, a first measurement reservoir having a supply chamber that decreases in volume upon actuation of the fluid injector, a second fluid pump for supplying the second fluid to the fluid injector, a second measurement reservoir having a supply chamber that decreases in volume upon actuation of the fluid injector, and a flow meter in fluid communication with an outlet port of the fluid injector.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a method or apparatus that comprises a list of elements does not include only those elements, but may include other elements not expressly listed or inherent to such a method or apparatus. In this disclosure, relative terms, such as, for example, "about," "substantially," "generally," and "approximately" are used to indicate a possible variation of ±10% in the stated value or characteristic.

Figure 1:
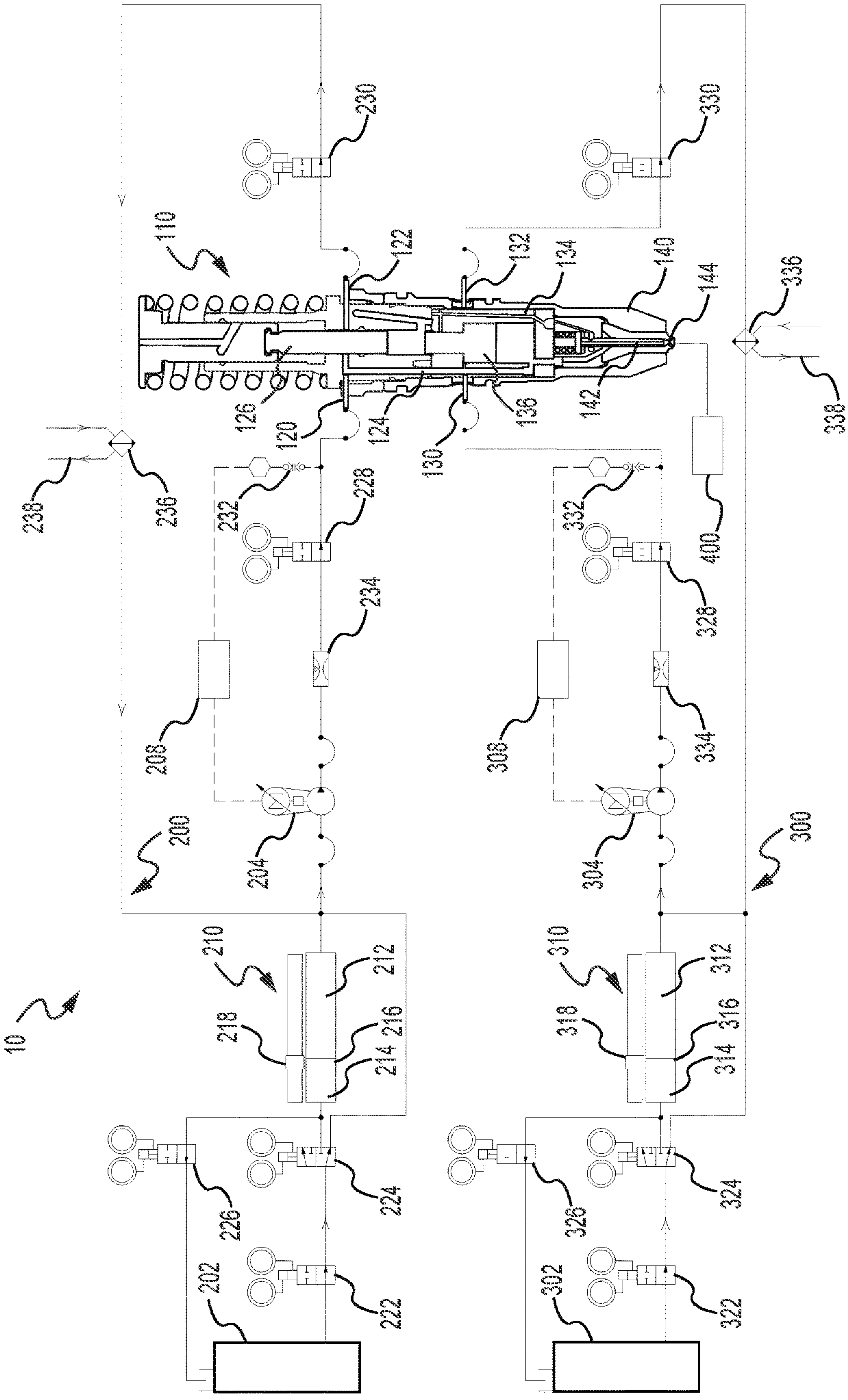
FIG. 1 is a schematic of an injector system, according to aspects of the disclosure.

FIG. 1 illustrates an exemplary injector system 10, according to aspects of the present disclosure. Injector system 10 may be a fuel injector system that includes an injector 110 (in some aspects, a fuel injector) in fluid communication with a first fluid circuit 200 and a second fluid circuit 300. One of first fluid circuit 200 and second fluid circuit 300 is configured to supply a first fluid (in some aspects, a pilot fuel) to injector 110. The other of first fluid circuit 200 and second fluid circuit 300 is configured to supply a second fluid (in some aspects, a primary fuel) to injector 110. Injector 110 is configured to inject the first fluid and the second fluid supplied by first and second fluid circuits 200, 300 in a single injection event (e.g., an injection event that includes a pilot injection, a main injection, and/or a post injection) via one or more nozzles 140 formed by the distal end portion of injector 110. In some aspects, injector 110 may include a single nozzle 140 in which the fluids from first and second fluid circuits 200, 300 intermix prior to an injection event. In some aspects, injector 110 may include a first nozzle 140 dedicated for the first fluid and a second nozzle 140 dedicated for the second fluid, so that the fluids do not intermix within injector 110 prior to an injection event.

In some aspects, the first fluid and the second fluid could be a pilot fuel and a primary fuel, as noted above, useful with an internal combustion engine. As used herein, a "primary" fuel refers to a fuel that, under steady state operating conditions of the internal combustion engine, is injected at a volume that is 50% or more of the total volume of fuel injected into a particular combustion chamber of the engine during an injection event that includes a pilot injection (e.g., of diesel fuel) and a main injection (e.g., of methanol). A "pilot fuel" may refer to a fuel that is mostly or entirely injected before the primary fuel in an injection event. Additionally, while the terms "pilot fuel" and "primary fuel" correlate to the orders in which these different fuels are injected, as understood, the pilot fuel injection and primary fuel injection may occur continuously, and may include the injection of a mixture of the two fuels for a period of time, in contrast to some injection methods in which the pilot and main injections are separated by a period of time during which no fuel is injected.

In some aspects, the first fluid and the second fluid may both be liquids, as opposed to gaseous fluids. As used herein, whether a fluid is "liquid" or "gaseous" is determined based on the state of the fluid as it is delivered to injector 110. For example, liquid methanol, ethanol, or a combination of alcohols may be supplied as the first fluid (or primary liquid fuel), while liquid diesel fuel may be supplied as the second fluid (or pilot liquid fuel). In contrast, a fluid delivered to injector 110 as a gas can be considered as a gaseous fluid, even if the gaseous fluid is stored in a liquid state.

Injector 110 includes a first fluid supply port 120 and a first fluid return port 122 fluidly connected to first fluid circuit 200. First fluid supply port 120 and first fluid return port 122 are fluidly connected to a first fluid pathway 124 within injector 110 that feeds to nozzle(s) 140 via actuation of a first fluid plunger 126. Similarly, injector 110 includes a second fluid supply port 130 and a second fluid return port 132 fluidly connected to second fluid circuit 300. Second fluid supply port 130 and second fluid return port 132 are fluidly connected to a second fluid pathway 134 within injector 110 that feeds to nozzle(s) 140 via actuation of a second fluid plunger 136. Thus, both the first fluid and the second fluid may be present in nozzle(s) 140 upon actuation of first fluid plunger 126 and second fluid plunger 136. Actuation (i.e. retraction) of a valve member 142 of nozzle 140 allows the first fluid and second fluid in nozzle(s) 140 to be injected from an outlet port 144 of nozzle(s) 140, thereby causing a multi-fuel injection event. In some aspects, valve member 142 may be actuated, for example, due to fluid pressure within nozzle(s) 140 acting in conjunction with the release of hydraulic pressure that holds valve member 142 in a closed position. In some aspects, outlet port 144 may include multiple orifices through which the fluid is injected. In aspects in which injector 110 includes a dedicated nozzle 140 for each of each of first fluid and second fluid, outlet port 144 may include one or more orifices in each nozzle 140 through which the respective fluids are injected. Injector 110 as shown in FIG. 1 is simplified for purposes of illustration; injector 110 may include additional fluid pathways and other components not specifically shown in FIG. 1.

First fluid circuit 200 includes a fluid tank 202, a pump 204, and a measurement reservoir 210. Fluid pump 204 may be, in some aspects, a centrifugal pump. Fluid pump 204 may be electronically controlled by a variable frequency drive (VFD) 208 or other suitable controller. Measurement reservoir 210 is configured to facilitate measurement of a volume of the first fluid removed from first fluid circuit 200 during an injection event, as described below.

In some aspects, measurement reservoir 210 may be in the form of a make-up cylinder including a supply chamber 212 and a pressurizing chamber 214. Supply chamber 212 and pressurizing chamber 214 are separated by a piston 216. Supply chamber 212 is in fluid communication with fluid pump 204 and contains the first fluid. When the first fluid contained in supply chamber 212 exits measurement reservoir 210, such as during an injection event, piston 216 slides within measurement reservoir 210, thereby decreasing a volume of supply chamber 212 and increasing a volume of pressurizing chamber 214. In some aspects, pressurizing chamber 214 is in fluid communication with fluid tank 202 via one or more valves, described below. In other aspects, pressurizing chamber 214 is supplied with air (and is not in fluid communication with fluid tank 202) to provide back pressure to piston 216 in the absence of fluid from fluid tank 202 that provides this back pressure. Measurement reservoir 210 further includes a displacement sensor 218, such as an encoder or linear displacement transducer, to detect a position of piston 216 within measurement reservoir 210. Measurement reservoir 210 may function as a first sensor for measuring a volume of flow of the first fluid to injector 110 in first fluid circuit 200.

First fluid circuit 200 further includes various valves for regulating the flow of the first fluid through first fluid circuit 200. A circulation supply valve 222 is in fluid communication with fluid tank 202. A piston selection valve 224 is located downstream of circulation supply valve 222. Piston selection valve 224 receives the first fluid from fluid tank 202 when circulation supply valve 222 is in an open position. Piston selection valve 224 has two operational positions. In a first operational position, an outlet of piston selection valve 224 is in fluid communication with pressurizing chamber 214 of measurement reservoir 210. In a second operational position (shown in FIG. 1), an outlet of piston selection valve 224 bypasses measurement reservoir 210 and is in fluid communication with pump 204.

A piston return valve 226 may be in fluid communication with fluid tank 202 and pressurizing chamber 214 of measurement reservoir 210 to selectably allow flow between fluid tank 202 and pressurizing chamber 214. An inlet supply valve 228 is located between pump 204 and fluid injection 110, allowing injector 110 to be isolated from pump 204. An inlet return valve 230 is located downstream of injector 110 in first fluid circuit 200. In an open position, inlet return valve 230 allows fluid supplied to injector 110 to flow back to fluid tank 202 via piston selection valve 224 and circulation supply valve 222. In a closed position, inlet return valve 230 isolates fluid injector from tank 202.

In some aspects, first fluid circuit 200 may further include a pressure sensor 232 connected upstream of injector 110 to measure the pressure of the first fluid provided to first fluid supply port 120 of injector 110. Pressure sensor 232 is in electrical (e.g., wired) communication or wireless communication with VFD 208.

In some aspects, first fluid circuit 200 may further include a surge suppressor 234 upstream of injector 110 to smooth flow of the first fluid from pump 204 to injector 110. Surge suppressor 234 may include, for example, a 30 pounds per square inch (psi) pre-charge of nitrogen.

In some aspects, first fluid circuit 200 may include a heat exchanger 236 for warming or cooling the first fluid and thereby minimizing the effect of thermal expansion on the quantity of fluid injected with injector 110. In some aspects, heat exchanger 236 may be a fluid-to-fluid heat exchanger in which a temperature-regulating fluid transfers heat to or from the first fluid. The temperature regulating fluid (which may be a calibration fluid such as commercially available under the trade name Viscor™) may be supplied to heat exchanger 236 via a heat exchanger circuit 238 that is fluidly isolated from first fluid circuit 200.

Second fluid circuit 300 may be substantially identical to first fluid circuit 200. That is, the components of second fluid circuit 300 may be structurally and/or functionally similar to corresponding components of first fluid circuit 200. In particular, components of second fluid circuit 300 have reference numerals 100 greater than structurally and/or functionally corresponding components of first fluid circuit 200. For example, second fluid circuit 300 includes a measurement reservoir 310 corresponding to measurement reservoir 210 of first fluid circuit 200. Measurement reservoir 310 of second fluid circuit 300 may be in the form of a make-up cylinder including a supply chamber 312, a pressurizing chamber 314, a piston 316 slidable between supply chamber 312 and pressurizing chamber 314, and a displacement sensor 318 for detecting the relative position of piston 316. Measurement reservoir 310 may function as a second sensor for measuring a volume of flow of the second fluid to injector 110 in second fluid circuit 300. In some aspects, tank 302, measurement reservoir 310, and various other components of second fluid circuit 300 may be of different physical size than their corresponding components in first fluid circuit 200. For example, measurement reservoir 310 of second fluid circuit 300 may be larger than measurement reservoir 210 of first fluid circuit 200 in aspects in which the second fluid is a primary fuel.

Injector system 10 may further include a flow meter 400, such as a shot-to-shot flow meter, in fluid communication with outlet port(s) 144 of injector 110. Flow meter 400 may be configured to measure a total volume of both the first and second fluid injected by injector 110 during one or more injection events.

Each of measurement reservoir 210, measurement reservoir 310, and flow meter 400 may serve as a sensor for measuring volume of fluid flowing through first fluid circuit 200 and/or second fluid circuit 300. For example, measurement reservoir 210 may serve as a first sensor for measuring volumetric flow of first fluid to injector 110 in first fluid circuit 200. Measurement reservoir 310 may serve as a second sensor for measuring volumetric flow of second fluid to injector 110 in second fluid circuit 300. Flow meter 400 may serve as a sensor for measuring the combined flow of the first fluid and the second fluid injected from injector 110. Alternatively, flow meter 400 may serve as a second sensor for measuring volumetric flow of second fluid to injector 110 in second fluid circuit 300, by subtracting the volume of fluid measured by the first sensor (e.g. measurement reservoir 210) from the total volume of fluid injected from injector 110.

In some aspects, it might be desirable to omit one of measurement reservoir 210, measurement reservoir 310, or flow meter 400. For example, some configurations may employ measurement reservoir 210 and flow meter 400, measurement reservoir 210 being used to measure volumetric flow in first fluid circuit 200, while flow meter 400 measures a total volumetric flow in both circuits 200 and 300. Flow in the second fluid circuit 300 may be determined by subtracting the volumetric flow measured with measurement reservoir 310 from the total volumetric flow measured with flow meter 400.

The foregoing description of injector system 10 is suitable in aspects in which injector system 10 is used in an injector calibration device for measuring the individual volumes of the first fluid and second fluid delivered by injector 110. However, injector system 10 may also be used and/or adapted for other devices and applications. In some aspects, injector system 10 may be adapted for use within an internal combustion engine, with injector 110 being secured to a cylinder head of the engine so as to inject the pilot and primary fuels into the combustion chamber. VFD 208 may communicate with an electronic control module ("ECM") of the engine, or may be incorporated in an ECM itself. In other aspects, injector system 10 may be adapted for use with an injector 110 that injects diesel exhaust fluid to a catalyst (e.g., a selective catalytic reduction catalyst), such as those used in conjunction with a diesel particulate filter (DPF) of an aftertreatment system for an internal combustion engine. In still other aspects, injector system 10 may be adapted for use with other non-fuel fluids, and used in any application in which measurement of multiple injected fluids is desired. Further, while injector system 10 is described as utilizing two fuels, injector system 10 may be adapted to use more than two fuels or other fluids.

INDUSTRIAL APPLICABILITY

Injector system 10 may be used to calibrate a fluid injector, such as multi-fuel injector 110, a DEF injector, etc., for desired fluid delivery. For example, injector system 10 may be used for an internal combustion engine that is suitable for combusting multiple fuels. Examples of such internal combustion engines include engines used for generating power in a stationary machine (e.g., a generator or other electricity-generating device), in a mobile machine (e.g., an earthmoving device, a hauling truck, a drilling machine, etc.), or in other applications in which it may be beneficial to operate an engine with a plurality of different fuels. The internal combustion engine may generate electrical power, and/or motive power, such as for providing power for operating one or more associated systems such as hydraulic systems.

Multi-fuel internal combustion engines use a first fuel, or pilot fuel, to initiate combustion of a second fuel, or primary fuel, that provides the majority of energy for operating the engine. The pressure required for combustion of the primary fuel may be greater than the pressure generated in the cylinder by the compression stroke of the engine. As such, the primary fuel may not combust due to engine compression alone. The pilot fuel generally combusts at a lower pressure than the primary fuel, and more particularly at a pressure lower than the maximum pressure that the engine generates during the compression stroke. As such, the pilot fuel combusts due to the compression, and the resulting combustion of the pilot fuel generates a flame that causes the primary fuel to combust.

Performance of a multi-fuel engine is dependent upon the injectors delivering the desired volume and proportions of the pilot fuel and the primary fuel during each injection event. Injector system 10 may be used to calibrate injector 110 to deliver the desired volumes and proportions of the pilot and primary fuels during an injection event (i.e., an actuation of injector 110). In particular, injector system 10 may be used to independently measure the volume of the pilot fuel and the primary fuel delivered by injector 110 during an injection event. While this measurement may be performed as part of a calibration process for a fuel injector in which the fuel is not combusted, system 10 may be provided as part of an internal combustion engine in which the fuel measured with reservoirs 210 and 310 is combusted in the engine.

Figure 2:
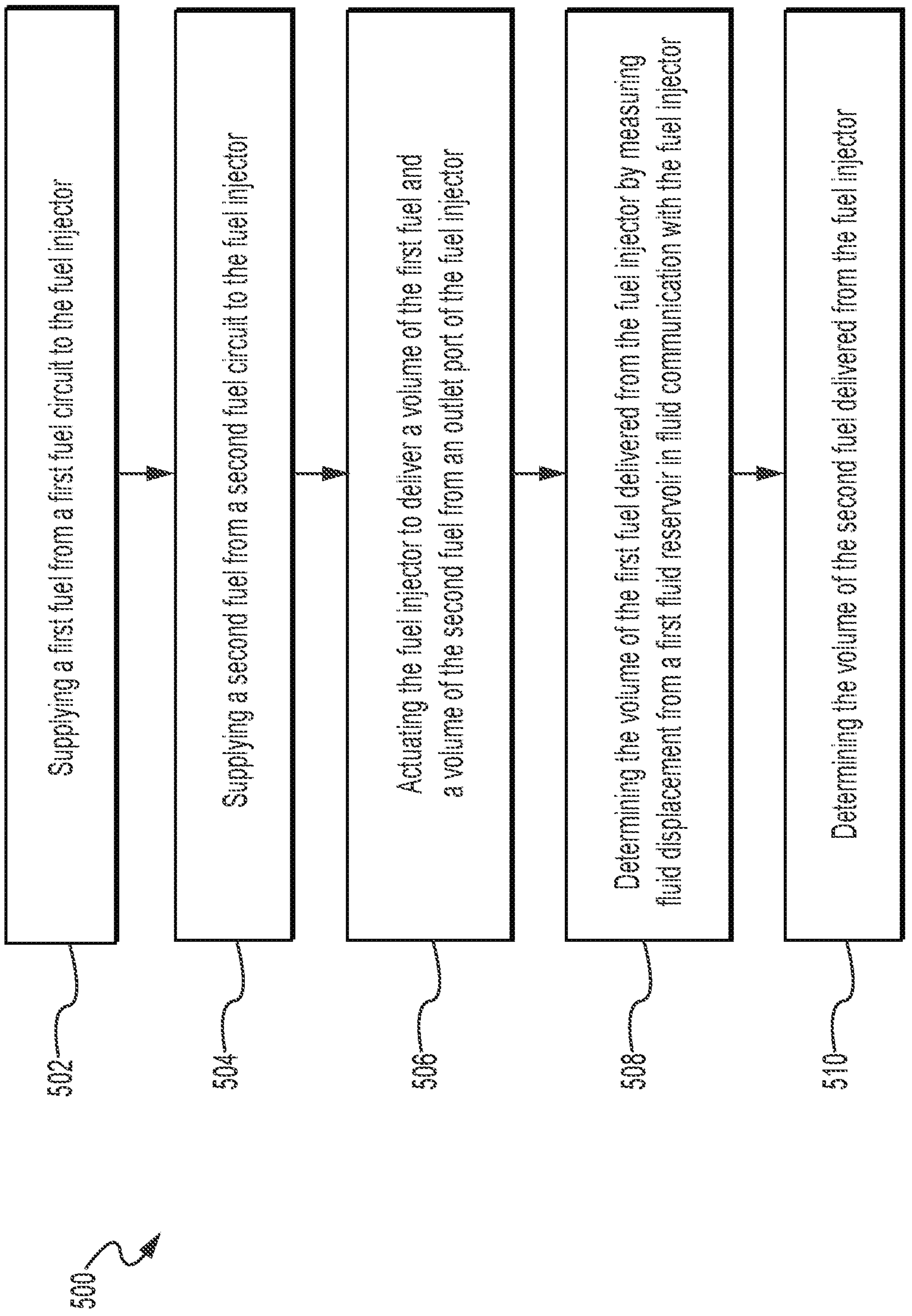
FIG. 2 is a flowchart depicting an exemplary fuel injection method, according to aspects of the disclosure.

FIG. 2 includes a flowchart for an exemplary method 500 for measuring fluid delivery from multi-fluid injector 110. Particularly, method 500 independently measures the volume of the first fluid (e.g., the first fuel) and the volume of the second fluid (e.g., the second fuel) delivered by injector 110 during one or more injection events.

Method 500 includes, at step 502 supplying the first fluid from first fluid circuit 200 to injector 110. Step 502 may include operating valves 222, 224, 226, 228, 230 as follows. Circulation supply valve 222 is opened to establish fluid communication between fluid tank 202 and piston selection valve 224. Piston selection valve 224 is moved to the second operational position so that the first fluid can flow from circulation supply valve 222, through piston selection valve 224, to pump 204 and supply chamber 212 of measurement reservoir 210. Piston return valve 226 is opened to establish fluid communication between fluid tank 202 and pressurizing chamber 214 of measurement reservoir 210. Inlet supply valve 228 is opened to establish fluid communication between fluid pump 204 and first fluid supply port 120 of injector 110. Inlet return valve 230 is opened to establish fluid communication between first fluid return port 122 of injector 110 and fluid tank 202 (via piston selection valve 224 and circulation supply valve 222).

With the valves operated in this manner, fluid pump 204 is actuated to draw the first fluid from fluid tank 202 to fill first fluid circuit 200. In doing so, the first fluid fills supply chamber 212 of measurement reservoir 210, and displaces piston 216 rearward (upstream towards valve 224). Any fluid in pressurizing chamber 214 of measurement reservoir 210 is displaced and returns to fluid tank 202 via piston return valve 226 (which is in an open position).

Injector 110 and supply chamber 212 of measurement reservoir 210 are then isolated from fluid tank 202 to create a closed loop system. In particular, piston return valve 226 is closed to break fluid communication between fluid tank 202 and pressurizing chamber 214 of measurement reservoir 210. Piston selection valve 224 is moved to first operational position to establish fluid communication between fluid tank 202 and pressurizing chamber 214 of measurement reservoir 210, and to break fluid communication between fluid tank 202 and pump 204. Injector 110 and supply chamber 212 of measurement reservoir 210 are thus no longer in fluid communication with fluid tank 202, and so a pressurized closed loop system is formed.

Method 500 further includes, at step 504, supplying the second fluid from second fluid circuit 300 to injector 110. Step 504 may be substantially the same as step 502, by carrying out the same procedure of step 502 utilizing corresponding components of second fluid circuit 300. As a result of step 504, a closed loop system is formed in second fluid circuit 300, with fluid tank 302 being isolated from pump 304, injector 110, and supply chamber 312 of measurement reservoir 310.

Method 500 further includes, at step 506, actuating injector 110 to deliver a volume of the first fluid and a volume of the second fluid from outlet port(s) 144 of injector 110. Actuating injector 110 includes retracting valve member 142 to allow the pressurized first fluid and the pressurized second fluid to flow out of outlet port(s) 144 of nozzle 140. During actuation of injector 110, at least a portion of the first fluid contained in supply chamber 212 of measurement reservoir 210 flows out of supply chamber 212 to fill the volume in first fluid circuit 200 vacated by the first fluid expelled from injector 110. Similarly, at least a portion of the second fluid contained in supply chamber 312 of measurement reservoir 310 flows out of supply chamber 312 to fill the volume in second fluid circuit 300 vacated by the second fluid expelled from injector 110.

As the first fluid leaves supply chamber 212 of measurement reservoir 210, the volume of supply chamber 212 decreases as piston 216 slides downstream (i.e. to the right in FIG. 1). Sliding of piston 216 expands the volume of pressurizing chamber 214 of measurement reservoir 210 and draws an additional volume of the first fluid into the pressurizing chamber 214 from fluid tank 202 via piston selection valve 224 and circulation supply valve 222. Measurement reservoir 310 operates in a similar manner, with piston 316 sliding distally and causing the second fluid to be drawn into pressurizing chamber 314 from fluid tank 302 via piston selection valve 324 and circulation supply valve 322.

Method 500 further includes, at step 508, determining the volume of the first fluid delivered from injector 110 by measuring fluid displacement from measurement reservoir 210. Particularly, the fluid displacement may be measured by determining the linear distance between an initial position (prior to actuating injector 110) and a final position (after actuating injector 110) of piston 216 within measurement reservoir 210. The linear distance may be determined by sensor 218, and may be converted to a volume by multiplying the linear distance by the internal cross-section area of supply chamber 212 of measurement reservoir 210.

Method 500 further includes, at step 510, determining the volume of the second fluid delivered from injector 110. In some aspects, step 510 may be performed by measuring fluid displacement from measurement reservoir 310 in fluid communication with injector 110. Particularly, the fluid displacement may be measured by determining the linear distance between an initial position (prior to actuating injector 110) and a final position (after actuating injector 110) of piston 316 within measurement reservoir 310. The linear distance may be determined by sensor 318, and may be converted to a volume by multiplying the linear distance by the internal cross-section area of supply chamber 312 of measurement reservoir 310.

In other aspects, step 510 may be performed by measuring a total volume of the first fluid and the second fluid delivered from injector 110, and subtracting the volume of the first fluid determined at step 508 from the total volume to determine the volume of the second fluid. The total volume of the first fluid and the second fluid delivered from injector 110 may be measured, for example, by flow meter 400.

In some aspects, a leak test may be performed during step 502 of method 500 after first fluid circuit 200 is pressurized. The leak test is performed by closing inlet supply valve 228 and return valve 230 to isolate injector 110 from the other components of first fluid circuit 200, with the exception of piping/tubing adjacent injector 110 between inlet supply valve 228 and inlet return valve 230. Pressure sensor 232 monitors the fluid pressure in the piping/tubing between inlet supply valve 228 and inlet return valve 230. A pressure drop indicates a leak in injector 110. If no leak is detected, inlet supply valves 228 and return valve 230 may be re-opened, and method 500 may be commenced.

Injector system 10 of the present disclosure provides for measurement of individual fluids supplied to injector 110 prior to the fluids being mixed during an injection event. As such, injector system 10 may be used to measure individual volumes of multiple fluids supplied to injector 110 from separate circuits, in addition to measuring the total volume of all fluids injected. Furthermore, by measuring volume based on displacement of pistons 216, 316 of measurement reservoirs 210, 310, injector system 10 is capable of measuring fluid under intermittent and/or non-continuous flow conditions, such as the pulsed flow generated by actuation of injector 110. As a result of these and other features of the present disclosure, injector system 10 may be utilized to test and/or calibrate injector 110 to verify that injector 110 delivers fluids at desired volumes and/or in desired proportions. Injector system 10 can therefore provide volume of fluid delivery on a shot-to-shot (or per injection event) basis, as well as average volumes over multiple injection events. In a fuel injection environment, such as a multi-fuel internal combustion engine utilizing a pilot fuel and primary fuel, injection system 10 may be used to test/calibrate injector 110 to ensure that an appropriate ratio of the pilot fuel to the primary fuel is injected. In particular, injection system 10 can be utilized to ensure that a sufficient volume of pilot fuel is injected to ignite the primary fuel during each injection event. Injector system 10 may also be advantageously used in an internal combustion engine for metering the pilot and primary fuels during operation of the engine.

It will be apparent to those skilled in the art that various modifications and variations can be made to the disclosed system and method without departing from the scope of the disclosure. Other embodiments of the system and method will be apparent to those skilled in the art from consideration of the specification and system and method disclosed herein. It is intended that the specification and examples be considered as exemplary only, with a true scope of the disclosure being indicated by the following claims and their equivalents.

What is claimed is:

1. A system for measuring fuel delivery from a multi-fuel injector of a device, the system comprising:
- a fuel injector for injecting a first fuel and a second fuel;
- a first fuel pump for supplying the first fuel to the fuel injector;
- a first sensor including a first measurement reservoir for measuring a volume of flow of the first fuel to the injector, the first measurement reservoir having a supply chamber that that decreases in volume upon actuation of the fuel injector;
- a second fuel pump for supplying the second fuel to the fuel injector; and
- a second sensor for measuring a volume of flow of the second fuel to the fuel injector.

2. The system of claim 1, wherein the fuel injector, the first fuel pump, and the first measurement reservoir form a closed-loop system during actuation of the fuel injector.

3. The system of claim 1, wherein the first measurement reservoir is a make-up cylinder comprising:
- the supply chamber;
- a pressurizing chamber;
- a slidable piston separating the supply chamber and the pressurizing chamber; and
- a displacement sensor for determining a position of the piston, wherein the supply chamber contains the first fuel.

4. The system of claim 3, wherein the pressurizing chamber is in fluid communication with a fuel tank containing the first fuel.

5. The system of claim 3, wherein the pressurizing chamber contains air to provide back pressure to the piston.

6. The system of claim 1, wherein the second sensor comprises at least one of:
- a second measurement reservoir having a supply chamber that decreases in volume upon actuation of the fuel injector; or
- a flow meter in fluid communication with an outlet port of the fuel injector.

7. The system of claim 1, wherein one of the first fuel and the second fuel comprises a pilot fuel, and
- wherein the other of the first fuel and the second fuel comprises a primary fuel.

8. The system of claim 7, wherein the pilot fuel comprises diesel, and
- wherein the primary fuel comprises at least one of methanol, ethanol, or a combination of alcohols.

9. The system of claim 1, wherein the device comprises a fuel injector calibration system.

10. The system of claim 1, wherein the device comprises an internal combustion engine.

11. A method for measuring fuel delivery from a multi-fluid fuel injector, the method comprising:
- supplying a first fuel from a first fuel circuit to the fuel injector;
- supplying a second fuel from a second fuel circuit to the fuel injector;
- actuating the fuel injector to deliver a volume of the first fuel and a volume of the second fuel from an outlet port of the fuel injector;
- determining the volume of the first fuel delivered from the fuel injector by measuring fluid displacement from a first measurement reservoir in fluid communication with the fuel injector; and
- determining the volume of the second fuel delivered from the fuel injector.

12. The method of claim 11, wherein determining the volume of the second fuel comprises:
- measuring fluid displacement from a second measurement reservoir in fluid communication with the fuel injector.

13. The method of claim 11, wherein determining the volume of the second fuel comprises:
- measuring a total volume of the first fuel and the second fuel delivered from the fuel injector; and
- subtracting the volume of the first fuel from the total volume.

14. The method of claim 11, wherein actuating the fuel injector causes a supply chamber of the first measurement reservoir to decrease in volume.

15. The method of claim 11, wherein a first fuel pump, the first measurement reservoir, and the fuel injector form a closed loop system during actuation of the fuel injector.

16. The method of claim 11, wherein supplying a first fuel from a first fuel circuit to the fuel injector comprises pressurizing the first fuel circuit.

17. The method of claim 11, wherein actuating the fuel injector comprises retracting a valve member of a nozzle of the fuel injector.

18. A system for measuring fluid delivery from a multi-fluid injector, the system comprising:

a fluid injector for injecting a first fluid and a second fluid;

a first fluid pump for supplying the first fluid to the fluid injector;

a first measurement reservoir having a supply chamber that decreases in volume upon actuation of the fluid injector;

a second fluid pump for supplying the second fluid to the fluid injector;

a second measurement reservoir having a supply chamber that decreases in volume upon actuation of the fluid injector; and a flow meter in fluid communication with an outlet port of the fluid injector.

19. The system of claim 18, wherein the first measurement reservoir is a make-up cylinder comprising:

the supply chamber;

a pressurizing chamber;

a slidable piston separating the supply chamber and the pressurizing chamber; and a displacement sensor for determining a position of the piston, wherein the supply chamber contains the first fluid.

20. The system of claim 19, further comprising a valve for establishing fluid communication between the pressurizing chamber of the first measurement reservoir and a fluid tank containing the first fluid.

* * * * *